(12) United States Patent  
Minami et al.

(10) Patent No.: US 10,619,117 B2
(45) Date of Patent: Apr. 14, 2020

(54) LUBRICANT INCLUDING SILICON-CONTAINING IONIC LIQUID

(71) Applicant: Nisshinbo Holdings Inc., Tokyo (JP)

(72) Inventors: Ichiro Minami, Kawasaki (JP); Gen Masuda, Chiba (JP)

(73) Assignee: Nisshinbo Holdings Inc., Tokyo (JP)

( * ) Notice: Subject to any disclaimer, the term of this patent is extended or adjusted under 35 U.S.C. 154(b) by 32 days.

(21) Appl. No.: 15/571,929

(22) PCT Filed: Apr. 6, 2016

(86) PCT No.: PCT/JP2016/061238
§ 371 (c)(1),
(2) Date: Nov. 6, 2017

(87) PCT Pub. No.: WO2016/181726
PCT Pub. Date: Nov. 17, 2016

(65) Prior Publication Data
US 2018/0134979 A1 May 17, 2018

(30) Foreign Application Priority Data

May 11, 2015 (JP) .................................. 2015-096581

(51) Int. Cl.
*C07F 7/08* (2006.01)
*C10M 105/76* (2006.01)
(Continued)

(52) U.S. Cl.
CPC .......... *C10M 105/76* (2013.01); *C07F 7/081* (2013.01); *C07F 9/5407* (2013.01);
(Continued)

(58) Field of Classification Search
CPC .......................... C10M 105/76; C10M 105/72
(Continued)

(56) References Cited

U.S. PATENT DOCUMENTS

2004/0030015 A1   2/2004   Chowdhury et al.
2010/0099589 A1*  4/2010   Ryan ................. C10M 141/06
                                                    508/280
(Continued)

FOREIGN PATENT DOCUMENTS

JP   2005-535690 A   11/2005
JP   2009-57541 A    3/2009
(Continued)

OTHER PUBLICATIONS

"Interface Technology", Maruzen Publishing, 2012, pp. 317-322, cited in Specification, w/English translation (21 pages).
(Continued)

*Primary Examiner* — Prem C Singh
*Assistant Examiner* — Francis C Campanell
(74) *Attorney, Agent, or Firm* — Westerman, Hattori, Daniels & Adrian, LLP (57) ABSTRACT

Provided is a lubricant including a silicon-containing ionic liquid represented by formula (1).

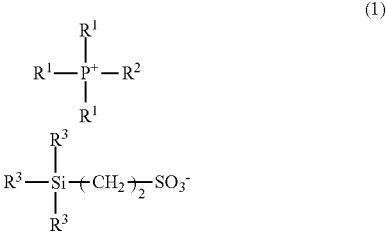

(1)

(In the formula, $R^1$ represents an alkyl group having 1 to 10 carbon atoms, $R^2$ represents an alkyl group having 8 to 20 carbon atoms, and $R^3$ represents an alkyl group having 1 to (Continued)

8 carbon atoms. Herein, it is provided that the number of carbon atoms in $R^2$ is greater than the number of carbon atoms in $R^1$.)

9 Claims, 6 Drawing Sheets

(51) Int. Cl.
*C10M 111/02* (2006.01)
*C07F 9/54* (2006.01)
*C10M 169/04* (2006.01)

(52) U.S. Cl.
CPC ......... *C10M 111/02* (2013.01); *C10M 169/04* (2013.01); *C10M 2207/289* (2013.01); *C10M 2215/04* (2013.01); *C10M 2219/083* (2013.01); *C10M 2223/0603* (2013.01); *C10M 2227/045* (2013.01); *C10N 2220/04* (2013.01); *C10N 2230/02* (2013.01); *C10N 2230/06* (2013.01); *C10N 2230/12* (2013.01)

(58) Field of Classification Search
USPC ....................................................... 508/207
See application file for complete search history.

(56) References Cited

U.S. PATENT DOCUMENTS

2010/0227785 A1\* 9/2010 Habeeb ................ C10M 141/08
508/370
2015/0203518 A1\* 7/2015 Masuda .................. C07F 7/081
556/428

FOREIGN PATENT DOCUMENTS

JP          2010-285398 A     12/2010
JP          2013-14536 A      1/2013

OTHER PUBLICATIONS

"Lubrication characteristic", Toray Research Center, 2013, pp. 67-73, cited in Specification, w/English translation (18 pages).
Somers et al., "Ionic Liquids as Antiwear Additives in Base Oils: Influence of Structure on Miscibility and Antiwear Performance for Steel on Aluminum", Applied Materials and Interfaces, 2013, vol. 5, pp. 11544-11553, cited in ISR (10 pages).
International Search Report dated May 10, 2016, issued in counterpart International Application No. PCT/JP2016/061238 (2 pages).

\* cited by examiner

LUBRICANT INCLUDING SILICON-CONTAINING IONIC LIQUID

TECHNICAL FIELD

The present invention relates to a lubricant which includes a silicon-containing ionic liquid

BACKGROUND ART

The term "ionic liquid" refers to a salt composed solely of ions which generally has a melting point of 100° C. or below. Various applied research is being done on ionic liquids on account of their properties. In particular, given their non-volatility, flame retardancy and high heat resistance, research is even being conducted on the use of ionic liquids as lubricants (see, for example, Patent Documents 1 and 2, and Non-Patent Documents 1 and 2).

Ionic liquids have the physicochemical qualities required of a lubricant. In particular, fluorinated ion-containing ionic liquids such as tetrafluoroborate hexafluorophosphate and bis(trifluoromethanesulfonyl)imide salts reportedly have excellent anti-wear properties. However, moisture infiltration is a problem. Even the infiltration of a trace amount of moisture sometimes leads to critical defects when this moisture reacts with hydrogen fluoride from fluorinated anions that have decomposed in chemical reactions (tribochemical reactions) activated by friction, causing metallic materials to corrode or polymer materials to deteriorate. Moreover, the hydrogen fluoride generated is strongly toxic and thus dangerous as well. Therefore, fluorine-containing ionic liquids generally have the reputation of being usable as lubricants only in space-related applications where moisture is absent or for ceramics without metal interfaces, and are not currently in practical use as general-purpose lubricants.

PRIOR ART DOCUMENTS

Patent Documents

Patent Document 1: JP-A 2009-57541
Patent Document 2: JP-A 2010-285398

Non-Patent Documents

Non-Patent Document 1: *Ion Ekitai no Kagaku—Shinsedai Ekitai e no Chōsen*—[The Science of ionic liquids—Toward a new generation of liquids], Maruzen Publishing (2012), pp. 317-322.
Non-Patent Document 2: *Ion Ekitai Tekunorojii* [Ionic liquid technology], Toray Research Center (2013), pp. 67-73.

SUMMARY OF THE INVENTION

Problems to Be Solved By the Invention

It is therefore an object of the present invention to provide a silicon-containing ionic liquid-containing lubricant which does not generate hydrogen fluoride on decomposition, and does not degrade metallic materials, polymer materials and the like.

Means for Solving the Problems

The inventors have conducted extensive investigations aimed at achieving the above object. As a result, they have discovered that fluorine atom-free ionic liquids composed of a silicon atom-containing anion and a phosphonium cation have low friction coefficients and are useful as lubricants.

Accordingly, the invention provides the following lubricants.

1. A lubricant which contains silicon-containing ionic liquid of formula (1) below

[Chemical Formula 1]

(1)

wherein $R^1$ is an alkyl group of 1 to 10 carbon atoms, $R^2$ is an alkyl group of 8 to 20 carbon atoms and $R^3$ is an alkyl group of 1 to 8 carbon atoms, with the proviso that the number of carbon atoms in $R^2$ is higher than the number of carbons in $R^1$.

2. The lubricant of 1 above, wherein $R^2$ is a linear alkyl group of 10 to 20 carbon atoms.

3. The lubricant of 1 or 2 above, wherein all $R^1$ groups are n-butyl or n-hexyl groups.

4. The lubricant of any of 1 to 3 above, wherein all $R^3$ groups are methyl groups.

5. The lubricant of any of 1 to 4 above which consists solely of a silicon-containing ionic liquid of formula (1).

6. The lubricant of any of 1 to 4 above, further containing at least one additive selected from the group consisting of surfactants, dispersants, antioxidants, anti-wear agents, rust inhibitors, corrosion inhibitors, friction modifiers, extreme pressure additives, antifoam agents, viscosity modifiers and pour point depressants.

7. The lubricant of 6 above, wherein the additive is a friction modifier or an anti-wear agent.

8. A silicon-containing ionic liquid of formula (1) below

[Chemical Formula 2]

(1)

wherein $R^1$ is an alkyl group of 1 to 10 carbon atoms, $R^2$ is an alkyl group of 8 to 20 carbon atoms and $R^3$ is an alkyl group of 1 to 8 carbon atoms, with the proviso that the number of carbon atoms in $R^2$ is higher than the number of carbons in $R^1$.

9. The silicon-containing ionic liquid of 8 above having any of fornmlas (2) to (4) below

[Chemical Formula 3]

wherein "Me" represents a methyl group, "n-Bu" represents an n-butyl group, and "n-Hex" represents a hexyl group.

Advantageous Effects of the Invention

This ionic liquid has a low friction coefficient and moreover is halogen-free, as a result of which it has a low environmental load and does not generate substances such as hydrogen fluoride that exhibit toxicity. Hence, it is safe and can be used even on metallic materials and polymer materials, making it useful as a general-purpose lubricant.

BRIEF DESCRIPTION OF THE DIAGRAMS

EMBODIMENT FOR CARRYING OUT THE INVENTION

The lubricant of the invention includes a silicon-containing ionic liquid Of formula (1) below.

[Chemical Formula 4]

In the formula, $R^1$ is an alkyl group of 1 to 10 carbon atoms, $R^2$ is an alkyl group of 8 to 20 carbon atoms and $R^3$ is an alkyl group of 1 to 8 carbon atoms, with the proviso that the number of carbon atoms in $R^2$ is higher than the number of carbons in $R^1$.

The alkyl group of 1 to 10 carbon atoms may be linear, branched or cyclic. Examples include methyl, ethyl, n-propyl, isopropyl, cyclopropyl, n-butyl, isobutyl, s-butyl, t-butyl, cyclobutyl, n-pentyl, cyclopentyl, n-hexyl, cyclohexyl, n-heptyl, n-octyl, n-nonyl and n-decyl groups.

The alkyl group of 8 to 20 carbon atoms may be linear, branched or cyclic. Examples include n-octyl, 2-ethylhexyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, and n-eicosyl groups.

The alkyl group of 1 to 8 carbon atoms may be linear, branched or cyclic, and is exemplified by the same groups having from 1 to 8 carbon atoms mentioned above as examples of the alkyl group having 1 to 10 carbon atoms.

In the invention, $R^1$ is preferably a linear alkyl group of 2 to 8 carbon atoms, more preferably a linear alkyl group of 3 to 8 carbon atoms, and even more preferably a linear alkyl group of 4 to 8 carbon atoms. Taking into account the properties of ionic liquids (hydrophobicity, heat resistance), production costs and other considerations, $R^1$ is even more preferably an n-butyl group or an n-hexyl group.

Taking into account the properties of ionic liquids (hydrophobicity, heat resistance), $R^2$ is preferably a linear alkyl group of 10 to 20 carbon atoms, and more preferably a linear alkyl group of 12 to 20 carbon atoms.

$R^3$ is preferably an alkyl group of 1 to 4 carbon atoms, more preferably an alkyl group of 1 to 3 carbon atoms, and most preferably a methyl group.

The ionic liquid can be synthesized in accordance with the method described in, for example, JP-A 2013-14536.

Because the ionic liquid is hydrophobic and has a low friction coefficient that undergoes little fluctuation, it can be favorably used as a lubricant. Moreover, because the ionic liquid does not form substances such as hydrogen fluoride that exhibit toxicity, there is no danger that it will cause the deterioration of metallic materials, polymer materials and the like. This ionic liquid can therefore be adapted to a variety of uses as a general-purpose lubricant.

The lubricant of the invention may consist entirely of the above ionic liquid, although it may include an additive or additives as well. The additive is not particularly limited, provided that it is a substance generally used as an additive for lubricating oils and dissolves in the above-described ionic liquid. Conventional ionic liquids which include a fluorine-containing anion such as $NTf_2^-$, $BF_4^-$ or $PF_6^-$ have little ability to dissolve such additives, making it difficult to improve the tribological properties. However, the above-described silicon-containing ionic liquid is able to dissolve such additives, thus making it possible to cost-effectively improve the tribological properties of the ionic liquid.

Such additives are exemplified by surfactants, dispersants, antioxidants, anti-wear agents, rust inhibitors, corrosion inhibitors, friction modifiers, extreme pressure additives, antifoam agents, viscosity modifiers, and pour point depressants.

Exemplary surfactants include sulfonate surfactants such as alkyl sulfonates and alkylbenzene sulfonates, salicylate surfactants, phosphate surfactants and phenate surfactants. When a surfactant is included, the content thereof is preferably from 0.1 to 10 wt % of the lubricant.

Exemplary dispersants include polyalkenyl succinimides, esters of polyalkenylsuccinic acids, Mannich base and organic phosphoric acid esters. When a dispersant is included, the content thereof is preferably from 0.1 to 10 wt % of the lubricant.

Exemplary antioxidants include zinc dithiophosphate, phenolic antioxidants, aromatic amine-type antioxidants, organosulfur compound-type antioxidants, hindered phenols and phosphite antioxidants. When an antioxidant is included, the content thereof is preferably from 0.1 to 10 wt %.

Exemplary anti-wear agents include phosphorus-containing anti-wear agents, sulfur-containing anti-wear agents, boric acid derivatives, chlorine-containing anti-wear agents, and zinc dithiophosphate. When an anti-wear agent is included, the content thereof is preferably from 0.1 to 10 wt % of the lubricant.

Exemplary rust inhibitors include sulfonates, polyhydric alcohol esters, and alkyl amines. When a rust inhibitor is included, the content thereof is preferably from 0.1 to 10 wt % of the lubricant.

Exemplary corrosion inhibitors include nitrogen-containing compounds such as benzotriazole compounds. When a corrosion inhibitor is included, the content thereof is preferably from 0.1 to 10 wt % of the lubricant.

Exemplary friction modifiers include glycerol fatty acid esters such as glycerol monooleate, and alkyl amines such as oleyl amine. When a friction modifier is included, the content thereof is preferably from 0.1 to 10 wt % of the lubricant.

Exemplary extreme pressure additives include sulfur-containing extreme pressure additives such as sulfurized oils and fats, sulfurized olefins, dibenzyl disulfide and dialkyl disulfides, and also phosphorus-containing extreme pressure additives. When an extreme pressure additive is included, the content thereof is preferably from 0.1 to 10 wt % of the lubricant.

Exemplary antifoam agents include silicone-type antifoam agents such as polymethylsiloxane. When an antifoam agent is included, the content thereof is preferably from 0.1 to 10 wt % of the lubricant.

Exemplary viscosity modifiers include hydrocarbon-type viscosity modifiers such as polyisobutylene, olefin copolymers and styrene/isoprene copolymers; and ester-type viscosity modifiers such as styrene esters and polymethacrylates. When a viscosity modifier is included, the content thereof is preferably from 0.1 to 10 wt % of the lubricant.

Exemplary pour point depressants include alkylated aromatic compounds, styrene/maleate copolymers and polymethacrylates. When a pour point depressant is included, the content thereof is preferably from 0.1 to 10 wt % of the lubricant.

Of these additives, including a friction modifier or an anti-wear agent is preferred from the standpoint of enabling the tribological properties to be controlled to a high degree.

EXAMPLES

Working Examples and Comparative Examples are given below by way of illustration, although the invention is not limited by these Examples.

[1] Synthesis of Ionic Liquids

Synthesis Example 1

Synthesis of Ionic Liquid 1

[Chemical Formula 5]

Ionic Liquid 1

Sodium 3-(trimethylsilyl)-1-propanesulfonate (Sigma-Aldrich Co.) in an amount of 1.00 g was dissolved in 120 mL of deionized water. To this solution was added a solution of 2.28 g of tributylhexadecylphosphonium bromide (Tokyo Chemical Industry Co., Ltd.) dissolved beforehand in 80 mL of deionized water, and the mixture was stirred overnight at room temperature. The reaction system was initially cloudy; when reacted overnight and then left to stand, it separated into two layers. To this reaction system was added 50 mL of ethyl acetate (Wako Pure Chemical Industries, Ltd.), and extraction of the organic layer was carried out. This operation was additionally repeated twice, following which the organic layers were combined and then rinsed twice with 50 mL of deionized water. About 20 g of potassium carbonate (Wako Pure Chemical Industries, Ltd.) was added to the organic layer to effect drying and the solids were filtered off, following which the solvent was driven off by distillation, giving 2.12 g (yield, 77%) of the target substance, Ionic Liquid 1, as a clear, colorless liquid. When this Ionic Liquid 1 was mixed with an equal volume of water, the system separated completely into two layers, confirming that the ionic liquid was hydrophobic.

Synthesis Example 2

Synthesis of Ionic Liquid 2

[Chemical Formula 6]

Ionic Liquid 2

Figure 1:
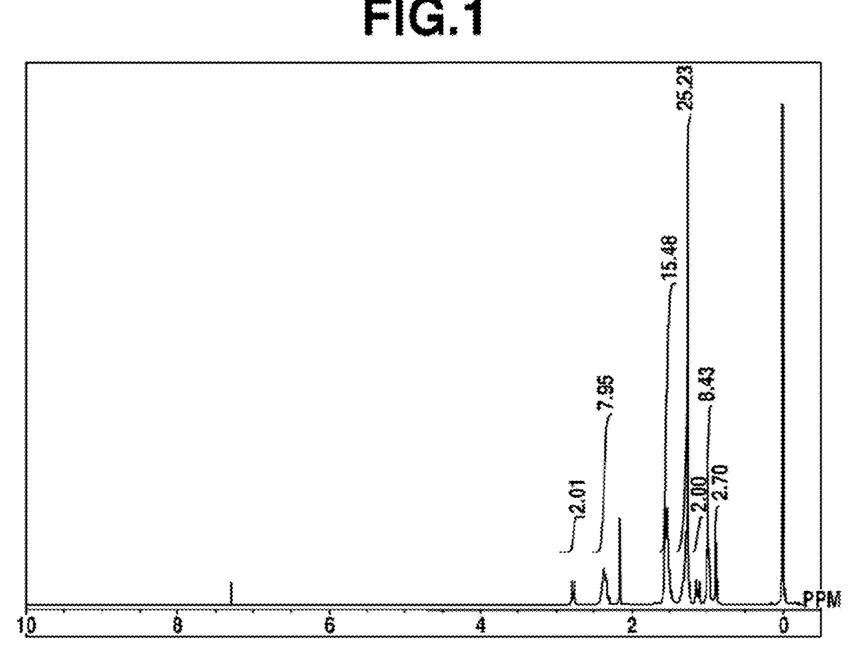
FIG. 1 is the $^1$H-NMR spectrum of Ionic Liquid 2 synthesized in Synthesis Example 2.

Aside from using sodium 2-(trimethylsilyl)-1-ethanesulfonate instead of sodium 3-(trimethylsilyl)-1-propanesulfonate, Ionic Liquid 2 was synthesized in the same way as in Synthesis Example 1. The sodium 2-(trimethylsilyl)-1-ethanesulfonate was synthesized by the method described in U.S. Pat. No. 3,141,898. FIG. 1 shows the $^1$H-NMR spectrum (obtained using the AL-400 spectrometer from JEOL, Ltd.; solvent, deuterated chloroform) of Ionic Liquid 2.

When this Ionic Liquid 2 was mixed with an equal volume of water, the system separated completely into two layers, confirming that the ionic liquid was hydrophobic.

Synthesis Example 3

Synthesis of Ionic Liquid 3

[Chemical Formula 7]

Ionic Liquid 3

Aside from using tributyldodecylphosphonium bromide (Tokyo Chemical Industry Co., Ltd.) instead of tributylhexadecylphosphonium bromide, Ionic Liquid 3 was synthesized in the same way as in Synthesis Example 1. When this Ionic Liquid 3 was mixed with an equal volume of water, the system separated completely into two layers, confirming that the ionic liquid was hydrophobic.

Synthesis Example 4

Synthesis of Ionic Liquid 4

[Chemical Formula 8]

Ionic Liquid 4

Figure 2:
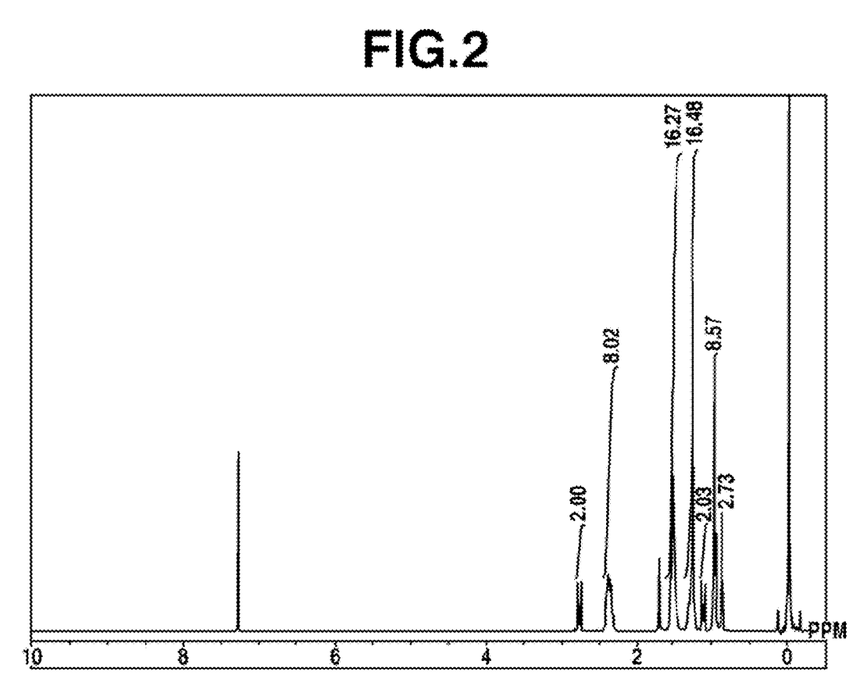
FIG. 2 is the $^1$H-NMR spectrum of Ionic Liquid 4 synthesized in Synthesis Example 4.

Aside from using tributyldodecylphosphonium bromide (Tokyo Chemical Industry Co., Ltd.) instead of tributylhexadecylphosphonium bromide, Ionic Liquid 4 was synthesized in the same way as in Synthesis Example 2. FIG. 2 shows the $^1$H-NMR spectrum (obtained using the AL-400 spectrometer from JEOL, Ltd.; solvent, deuterated chloroform) of Ionic Liquid 4. When this Ionic Liquid 4 was mixed with an equal volume of water, the system separated completely into two layers, confirming that the ionic liquid was hydrophobic.

Synthesis Example 5

Synthesis of Ionic Liquid 5

[Chemical Formula 9]

Ionic Liquid 5

Figure 3:
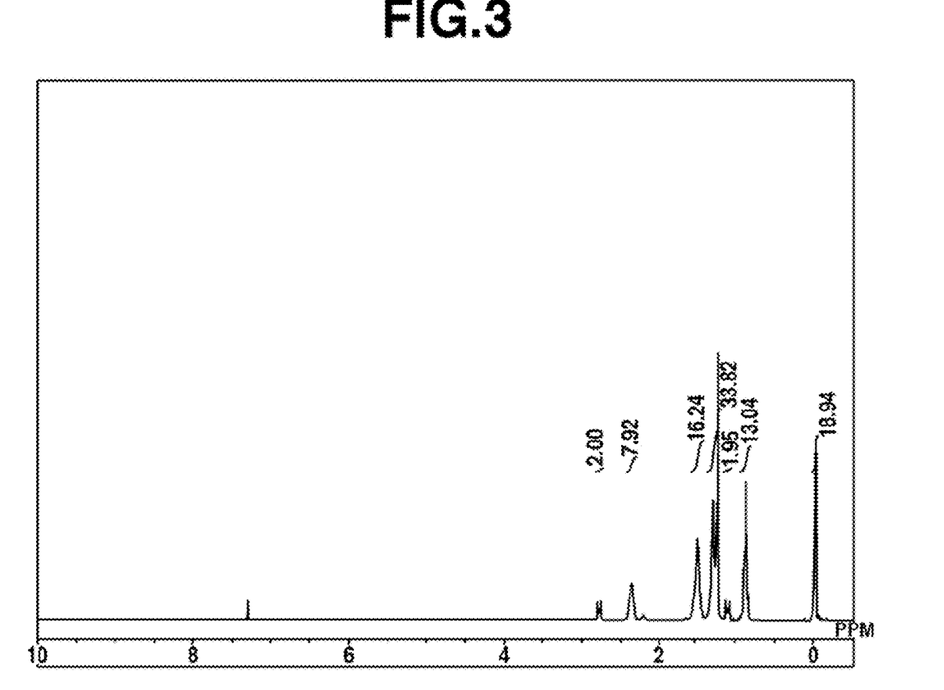
FIG. 3 is the $^1$H-NMR spectrum of Ionic Liquid 5 synthesized in Synthesis Example 5.

Aside from using trihexyltetradecylphosphonium bromide (Tokyo Chemical Industry Co. Ltd.) instead of tributylhexadecylphosphonium bromide, Ionic Liquid 5 was synthesized in the sauce way as in Synthesis Example 2. FIG. 3 shows the $^1$H-NMR spectrum (obtained using the AL-400 spectrometer from JEOL, Ltd.; solvent, deuterated chloroform) of Ionic Liquid 5. When this Ionic Liquid 5 was mixed with an equal volume of water, the system separated completely into two layers, confirming that the ionic liquid was hydrophobic.

[2] Measurement of Physical Properties of Ionic Liquids

The melting points (Tm), decomposition points (Td), viscosities (η) and electrical conductivities (χ) of Ionic Liquids 1 to 5 were measured. The melting point was measured with the DSC 6200 from Seiko Instruments under the following conditions: the temperature was raised from 20° C. to 60° C. at a rate of 10° C./min and held at 60° C. for 1 minute, then lowered from 60° C. to −90° C. at 1° C./min and held at −90° C. for 1 minute, and subsequently raised from −90° C. to 60° C. at 1° C./min. The decomposition point was measured in an air atmosphere and at a temperature rise rate of 10° C./min from 30 to 500° C. The decomposition point was the temperature at which the weight decreased 10%. The viscosities at 25° C. and 60° C. (the viscosity of Ionic Liquid 5 was measured only at 25° C.) were measured with a programmable rheometer from Brookfield. The electrical conductivities at 25° C. and 60° C. (the electrical conductivity of Ionic Liquid 5 was measured only at 25° C.) were measured with the CM-30R conductivity meter from DKK-Toa Corporation. The results are shown in Table 1.

TABLE 1

|  |  | Ionic Liquid 1 | Ionic Liquid 2 | Ionic Liquid 3 | Ionic Liquid 4 | Ionic Liquid 5 |
| --- | --- | --- | --- | --- | --- | --- |
| Tm (° C.) |  | −5 | 5 | 2 | −6 | −19 |
| Td (° C.) |  | 299 | 316 | 291 | 311 | 310 |
| η (cP) | 25° C. | 1,735 | 1,932 | 2,429 | 2,570 | 1,943 |
|  | 60° C. | 142 | 269 | 104 | 208 | — |
| χ (mS/cm) | 25° C. | 0.02 | 0.0041 | 0.02 | 0.0062 | 0.0038 |
|  | 60° C. | 0.16 | 0.39 | 0.20 | 0.30 | — |

[3] Preparation of Lubricants

Comparative Example 1-1

Preparation of Lubricant A

A lubricant consisting solely of Ionic Liquid 1 was prepared as Lubricant A.

Working Example 1-1

Preparation of Lubricant B

A lubricant consisting solely of Ionic Liquid 2 was prepared as Lubricant B.

Comparative Example 1-2

Preparation of Lubricant C

A lubricant consisting solely of Ionic Liquid 3 was prepared as Lubricant C.

Working Example 1-2

Preparation of Lubricant D

A lubricant consisting solely of Ionic Liquid 4 was prepared as Lubricant D.

Working Example 1-3

Preparation of Lubricant E

A lubricant consisting solely of Ionic Liquid 5 was prepared as Lubricant E.

Working Example 1-4

Preparation of Lubricant F

Lubricant F was prepared by adding 5 wt % of glycerol monooleate (GMO) as an additive to Ionic Liquid 2 and calmly stirring at room temperature (20 to 25° C.) so as to obtain a uniform solution.

Working Example 1-5

Preparation of Lubricant G

Aside from using dibenzyl disulfide (DBDS) instead of GMO and setting the temperature during stirring to 35 to 40° C., Lubricant G was prepared in the same way as in Working Example 1-4.

Working Example 1-6

Preparation of Lubricant H

Aside from using oleyl amine (OleAm) instead of GMO, Lubricant H was prepared in the same way as in Working Example 1-4.

[4] Friction Tests

Working Example 2, Comparative Example 2

Figure 4:
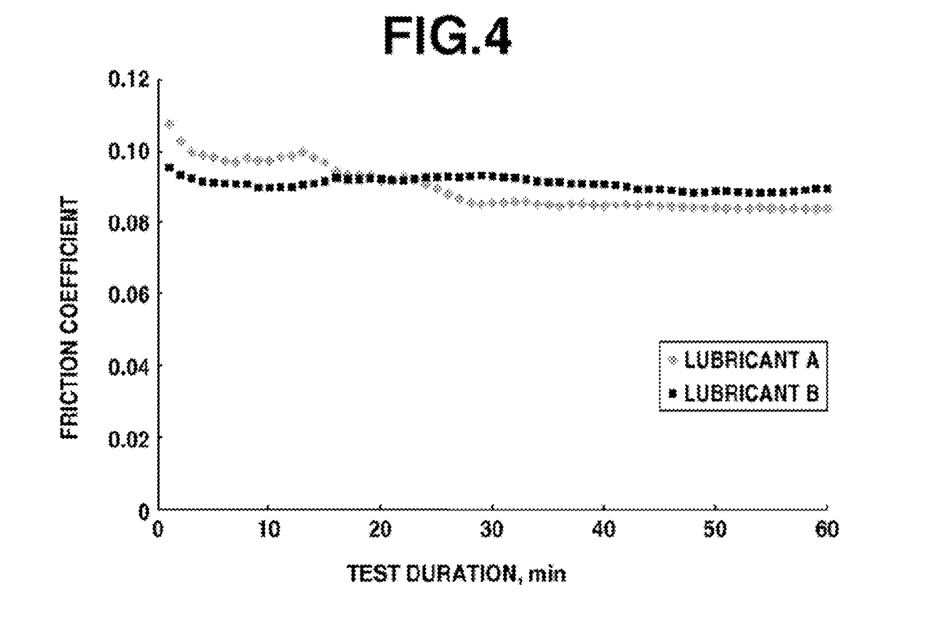
FIG. 4 is a graph showing the change over time in the friction coefficients measured in Working Example 2 and Comparative Example 2.

Friction tests were carried out using Lubricants A (Comparative Example 2) and B (Working Example 2). The friction tests were performed by steel ball—steel disk contact using an SRV tester (from Optimol), as specified in ASTM D 6425. Specifically, a test specimen was set in the tester, following which the change over time in friction coefficient was tracked under the conditions in Table 2. The results are shown in FIG. 4.

TABLE 2

| Measurement conditions | Load (N) | 100 |
|---|---|---|
| | Maximum contact stress (GPa) | 2.09 |
| | Hertzian contact diameter (μm) | 302 |
| | Oscillation frequency (Hz) | 50 |
| | Stroke (mm) | 1.00 |
| | Lubricant temperature (° C.) | 25 |
| | Amount of lubricant (cm$^3$) | 0.3 |
| | Test duration (min) | 60 |
| Ball | Material | AISI 52100 (steel) |
| | Size (mm) | 10 mm (dia) |
| Disk | Material | AISI 52100 (steel) |
| | Size (mm) | 24 mm (dia) × 7.9 mm |

In the case of Lubricant B (Working Example 2), the friction coefficient was stable as of immediately after the start of the test and stabilized at 0.1 or less. By contrast, in the case of Lubricant A (Comparative Example 2), the friction coefficient was 0.1 or more immediately after the start of the test, and reaching a steady state (a stable state with little fluctuation) took time. Hence, Lubricant B had a superior performance as a lubricant.

Working Example 3, Comparative Example 3

Figure 5:
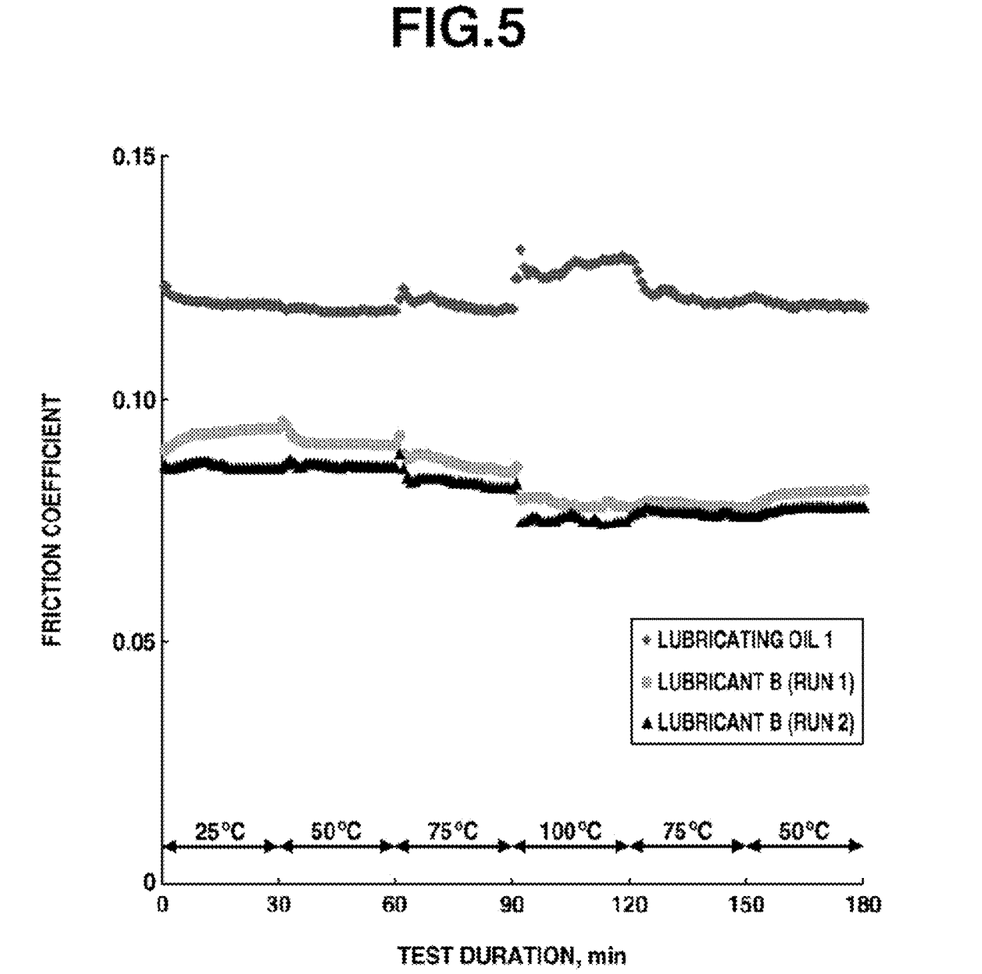
FIG. 5 is a graph showing the change over time in the friction coefficients measured in Working Example 3 and Comparative Example 3.

Friction tests were carried out using Lubricant B (Working Example 3) and Lubricating Oil 1 (mineral oil, API Group I)—a commercial lubricant for hydraulic equipment (Comparative Example 3). The friction tests were carried out under the conditions in Table 3 using the same SRV tester and ball/disk as in Working Example 2. Specifically, a test specimen was set in the tester, following which the temperature was changed every 30 minutes and the change over time in friction coefficient was tracked. In the case of Lubricant B, the repeatability was confirmed by carrying out two runs for each test specimen. The results are shown in FIG. 5.

TABLE 3

| Measurement conditions | Load (N) | 100 |
|---|---|---|
| | Maximum contact stress (GPa) | 2.09 |
| | Hertzian contact diameter (μm) | 302 |
| | Oscillation frequency (Hz) | 50 |
| | Stroke (mm) | 1.00 |
| | Lubricant temperature (° C.) | 25 → 50 → 75 → 100 → 75 → 50 |
| | Amount of lubricant (cm$^3$) | 0.3 |
| | Test duration (min) | 30 minutes each step |
| Ball | Material | AISI 52100 (steel) |
| | Size (mm) | 10 mm (dia) |
| Plate | Material | AISI 52100 (steel) |
| | Size (mm) | 24 mm (dia) × 7.9 mm |

Lubricating Oil 1 had a friction coefficient of at least 0.11 at 25° C., and showed a tendency for the friction coefficient to increase as the temperature rises. By contrast, Lubricant B had a lower friction coefficient than Lubricating Oil 1. This performance did not worsen even in the 75 to 100° C. range; rather, an improving tendency was seen. That is, Lubricant B had a better lubricating performance than Lubricating Oil 1 under harsher conditions. Lubricant B also had a good repeatability.

Figure 6:
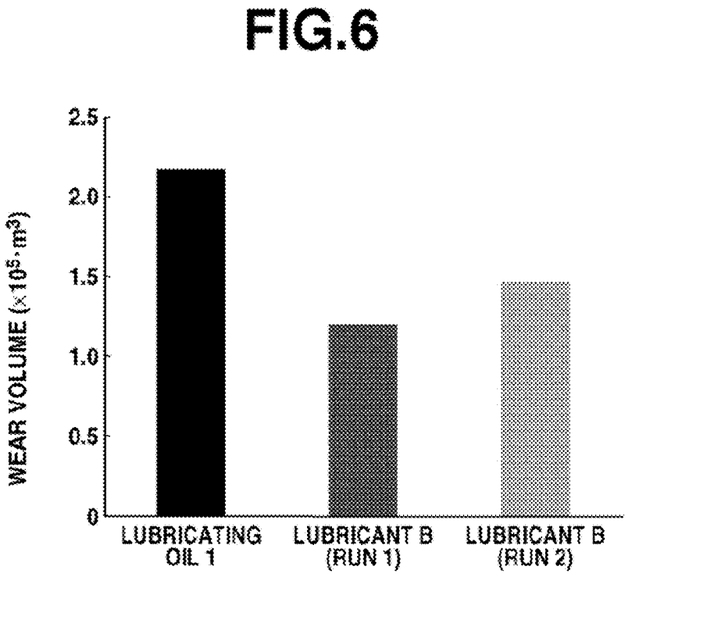
FIG. 6 is a graph showing the wear volume of test balls measured in Working Example 3 and Comparative Example 3.

In addition, the test ball wear volumes were compared. The results are shown in FIG. 6. Compared with commercial Lubricating Oil 1, the wear volume was lower when Lubricant B was used.

These results demonstrate that the ionic liquids used in this invention are lubricants which have a practical performance comparable to that of commercial lubricating oils for hydraulic equipment, possess a low friction coefficient, and are remarkably useful particularly under heating conditions at 50 to 100° C.

Working Examples 4-1 to 4-3, Comparative Example 4-1

Figure 7:
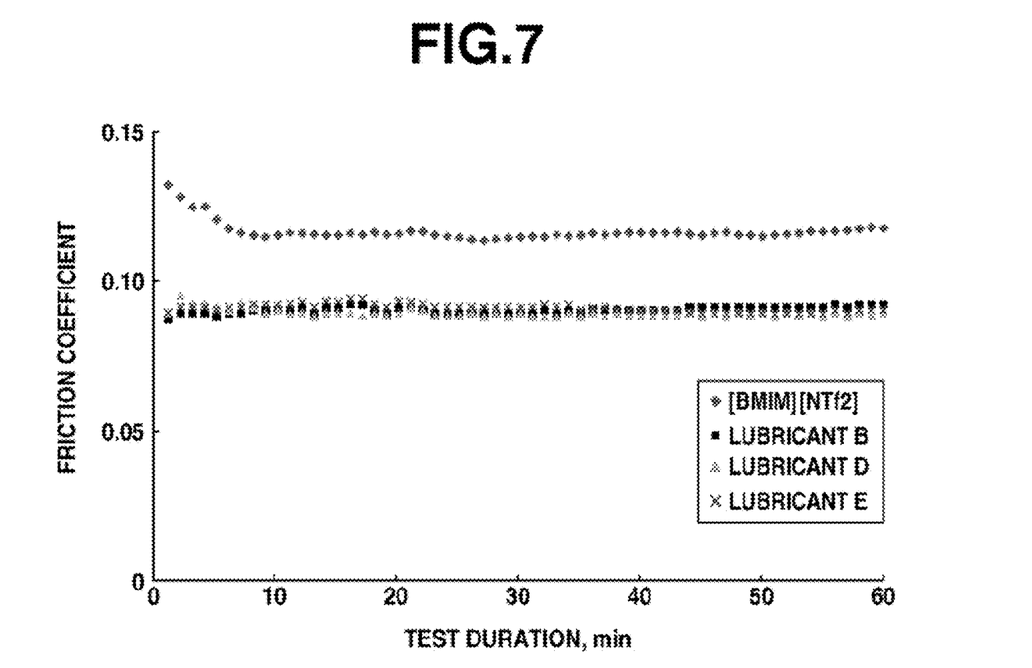
FIG. 7 is a graph showing the change over time in the friction coefficients measured in Working Examples 4-1 to 4-3 and Comparative Example 4-1.

The friction coefficients were compared for the commercial ionic liquid butylmethylimidazolium bis(trifluoromethanesulfonyl)imide (Kanto Chemical Co., Ltd.; abbreviated below as [BMIM][NTf$_2$]) (Comparative Example 4-1) and Lubricants B, D and E (Working Examples 4-1 to 4-3). Measurement of the friction coefficient was carried out under the conditions in Table 4 using the same SRV tester and ball/disk as in Working Example 1. The results are shown in FIG. 7.

TABLE 4

| Measurement conditions | Load (N) | 100 |
| --- | --- | --- |
| | Maximum contact stress (GPa) | 2.09 |
| | Hertzian contact diameter (µm) | 302 |
| | Oscillation frequency (Hz) | 50 |
| | Stroke (mm) | 1.00 |
| | Lubricant temperature (° C.) | 25 |
| | Amount of lubricant (cm3) | 0.3 |
| | Test duration (min) | 60 |
| Ball | Material | AISI 52100 (steel) |
| | Size (mm) | 10 mm (dia) |
| Disk | Material | AISI 52100 (steel) |
| | Size (mm) | 24 mm (dia) × 7.9 mm |

Lubricants B, D and E all had low friction coefficients of 0.1 or less. Moreover, they exhibited friction coefficients that were about 10 to 20% lower than even the existing ionic liquid [BMIM][NTf$_2$], which is one type of ionic liquid having the anion NTf$_2^-$ that is regarded to have a good performance as a lubricant. Moreover, the friction coefficients of lubricants B, D and E immediately after the start of testing were all stable and small, and their fluctuations were also small. By contrast, [BMIM][NTf$_2$] had a large friction coefficient immediately after the start of testing, and reaching a steady state took time.

Comparative Example 4-2

Figure 8:
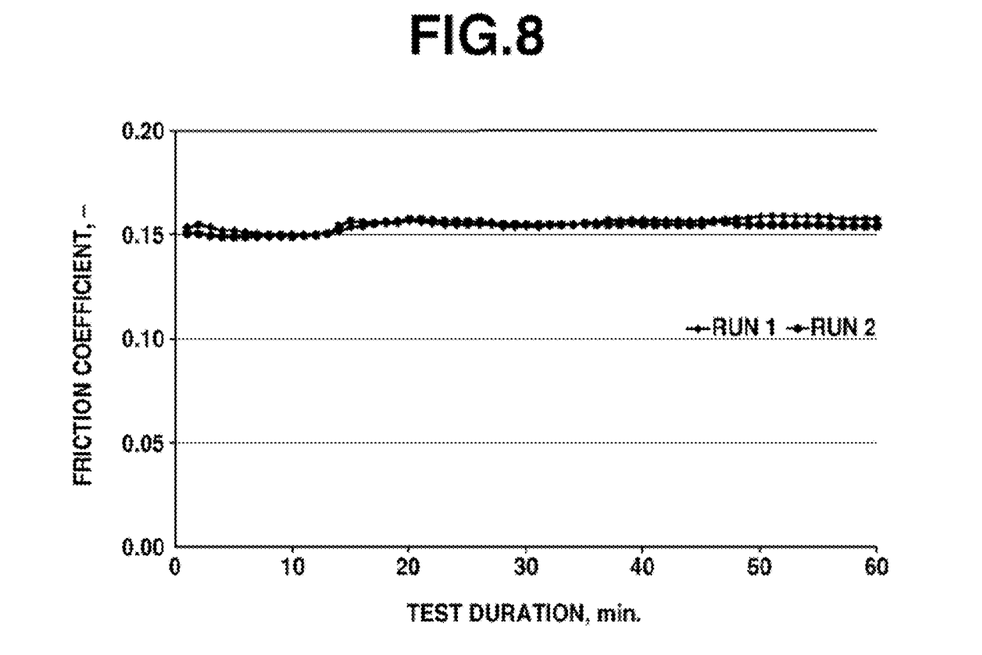
FIG. 8 is a graph showing the change over time in the friction coefficients measured in Comparative Example 4-2.

The friction coefficient of a commercial fluorinated synthetic lubricant (Fomblin-317926, from Solvay) was measured under the same conditions as in Table 4. The results are shown in FIG. 8. Measurement was carried out twice (Run 1 and Run 2).

Comparative Example 4-3

Figure 9:
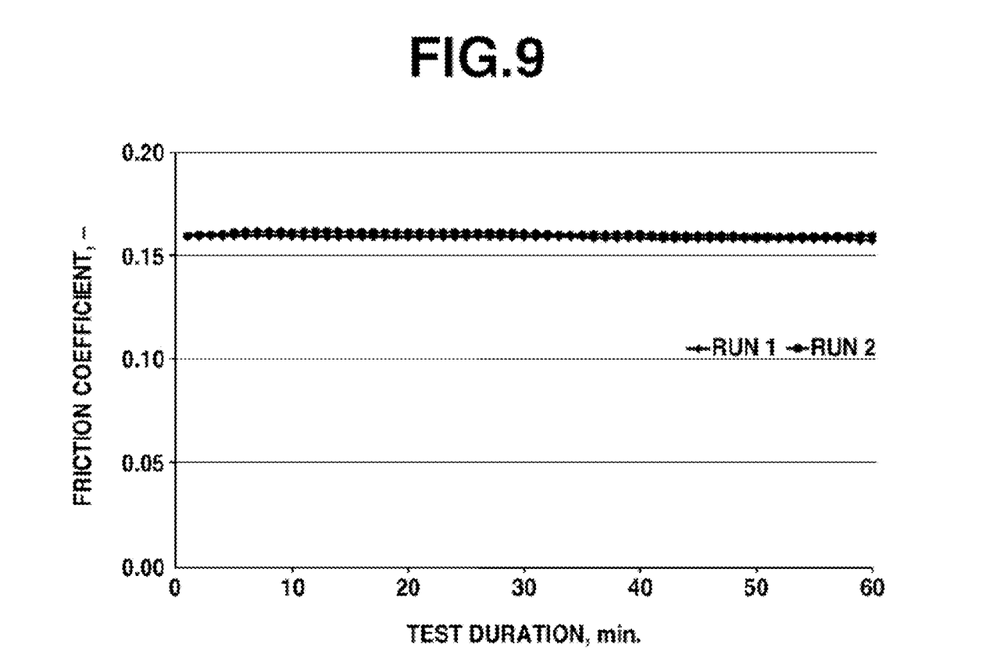
FIG. 9 is a graph showing the change over time in the friction coefficients measured in Comparative Example 4-3.

The friction coefficient of a commercial fluorinated synthetic lubricant (Fomblin-317950, from Solvay) was measured under the same conditions as in Table 4. The results are shown in FIG. 9. Measurement was carried out twice (Run 1 and Run 2).

As is apparent from the results shown in FIGS. 8 and 9, the commercial fluorinated synthetic lubricants (Fomblin-317926 and Fomblin-317950) had larger friction coefficients than the lubricants of the invention. Moreover, when measurement was carried out under a load of 100 N using Fomblin-317926, fluctuations in the friction coefficient were observed during measurement.

Working Examples 5-1 to 5-3

Friction tests were carried out using Lubricants F, G and H (Working Examples 5-1 to 5-3). The friction test was performed by steel ball to steel disk contact using an SRV tester (from Optimol), as specified in ASTM D 5425. Specifically, a test specimen was set in the tester, following which the change over time in friction coefficient was tracked under the conditions in Table 5.

TABLE 5

| Measurement conditions | Load (N) | 100 |
| --- | --- | --- |
| | Maximum contact stress (GPa) | 2.09 |
| | Hertzian contact diameter (µm) | 302 |
| | Oscillation frequency (Hz) | 50 |
| | Stroke (mm) | 1.00 |
| | Lubricant temperature (° C.) | 25 |
| | Amount of lubricant (cm3) | 0.3 |
| | Test duration (min) | 60 |

TABLE 5-continued

| Ball | Material | AISI 52100 (steel) |
| --- | --- | --- |
| | Size (mm) | 10 mm (dia) |
| Disk | Material | AISI 52100 (steel) |
| | Size (mm) | 24 mm (dia) × 7.9 mm |

Figure 10:
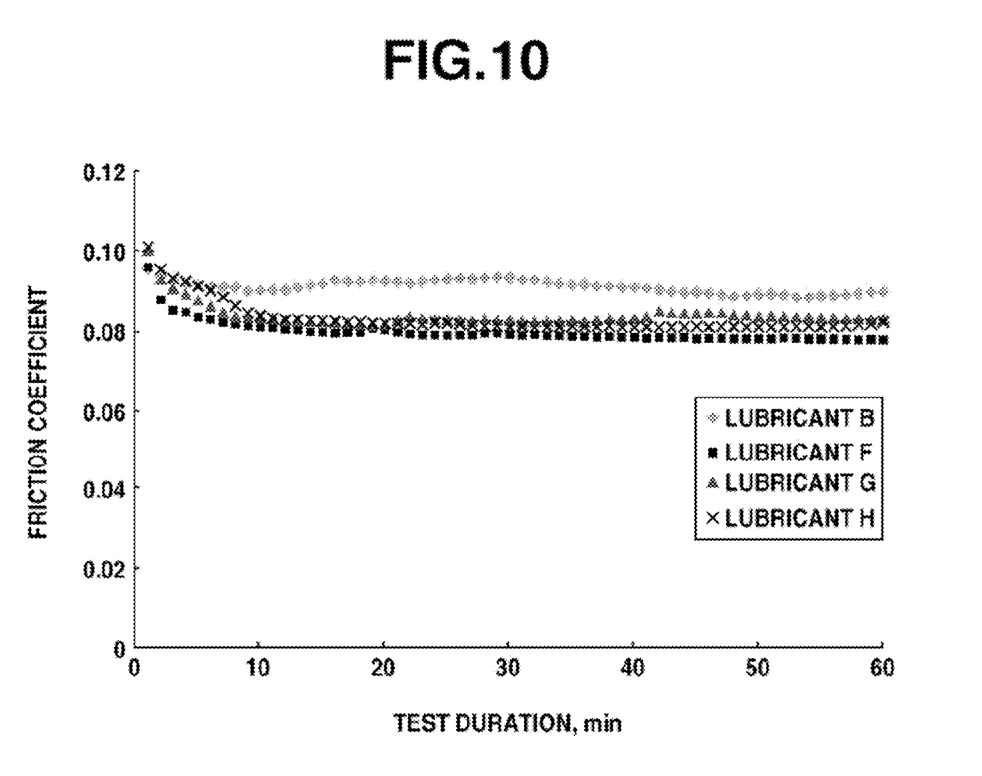
FIG. 10 is a graph showing change over time in the friction coefficients measured in Working Examples 2, 5-1 to 5-3.

FIG. 10 shows the change over time in the friction coefficient for Lubricants F, G and H together with the results from Working Example 2 (Lubricant B). Lubricants F, G and H containing specific additives each exhibited lower friction coefficients than Lubricant B. This demonstrates that the lubricant performance can be improved by adding an additive.

It is apparent from the above that the lubricants of the invention have an excellent performance.

The invention claimed is:

1. A lubricant consisting of a silicon-containing ionic liquid as a main component, and optionally at least one additive selected from the group consisting of surfactants, dispersants, antioxidants, anti-wear agents, rust inhibitors, corrosion inhibitors, friction modifiers, extreme pressure additives, antifoam agents, viscosity modifiers and pour point depressants,
wherein the silicon-containing ionic liquid has formula (1) below

[Chemical Formula 1]

wherein R$^1$ is an alkyl group of 1 to 10 carbon atoms, R$^2$ is an alkyl group of 8 to 20 carbon atoms and R$^3$ is an alkyl group of 1 to 8 carbon atoms, with the proviso that the number of carbon atoms in R$^2$ is higher than the number of carbons in R$^1$, and
wherein when the at least one additive is present in the lubricant, a content of each of the at least one additive is from 0.1 to 10 wt % of the lubricant.

2. The lubricant of claim 1, wherein R$^2$ is a linear alkyl group of 10 to 20 carbon atoms.

3. The lubricant of claim 1, wherein all R$^1$ groups are n-butyl or n-hexyl groups.

4. The lubricant of claim 1, wherein all R$^3$ groups are methyl groups.

5. The lubricant of claim 1, wherein the additive is a friction modifier or an anti-wear agent.

6. The lubricant of claim 2, wherein all R$^1$ groups are n-butyl or n-hexyl groups.

7. The lubricant of claim 2, wherein all R$^3$ groups are methyl groups.

8. The lubricant of claim 3, wherein all R$^3$ groups are methyl groups.

9. The lubricant of claim 1, wherein the additive is a friction modifier selected from the group consisting of glycerol monooleate and oleyl amine, and a content of the friction modifier is 0.1-5 wt % of the lubricant, or an extreme pressure additive, and a content of the extreme pressure additive is 0.1-5 wt % of the lubricant.

* * * * *